United States Patent
Watanabe et al.

(10) Patent No.: US 8,880,953 B2
(45) Date of Patent: Nov. 4, 2014

(54) COMPUTER-READABLE RECORDING MEDIUM, APPARATUS, AND METHOD FOR PROCESSING DATA

(75) Inventors: Yukihiro Watanabe, Kawasaki (JP); Yasuhide Matsumoto, Kawasaki (JP); Masazumi Matsubara, Kawasaki (JP); Atsuji Sekiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 367 days.

(21) Appl. No.: 13/317,027

(22) Filed: Oct. 7, 2011

(65) Prior Publication Data
US 2012/0166879 A1 Jun. 28, 2012

(30) Foreign Application Priority Data
Dec. 28, 2010 (JP) .................... 2010-294282

(51) Int. Cl.
*G06F 11/00* (2006.01)
*G06F 11/07* (2006.01)

(52) U.S. Cl.
CPC .................. *G06F 11/0751* (2013.01)
USPC ......................................................... 714/42

(58) Field of Classification Search
CPC .............. G06F 11/0778; G06F 11/079; G06F 11/3648; G06F 11/0727; G06F 11/3466; G11B 20/1883
USPC .................................................... 714/37, 42
See application file for complete search history.

(56) References Cited

U.S. PATENT DOCUMENTS

| | | | |
|---|---|---|---|
| 7,203,881 B1 * | 4/2007 | Williams et al. | 714/741 |
| 2005/0050150 A1 * | 3/2005 | Dinkin | 709/207 |
| 2005/0172162 A1 * | 8/2005 | Takahashi et al. | 714/4 |
| 2006/0256714 A1 | 11/2006 | Takagi | |
| 2007/0056038 A1 * | 3/2007 | Lok | 726/23 |
| 2007/0174449 A1 * | 7/2007 | Gupta | 709/224 |
| 2007/0174708 A1 * | 7/2007 | Miyazaki et al. | 714/37 |
| 2008/0183855 A1 * | 7/2008 | Agarwal et al. | 709/223 |
| 2010/0003967 A1 * | 1/2010 | Datta et al. | 455/412.1 |
| 2011/0047417 A1 * | 2/2011 | Malnati et al. | 714/49 |
| 2011/0302461 A1 * | 12/2011 | Goertler et al. | 714/57 |
| 2012/0127876 A1 * | 5/2012 | Hunukumbure et al. | 370/252 |
| 2013/0290784 A1 * | 10/2013 | Morimura et al. | 714/26 |

FOREIGN PATENT DOCUMENTS

| | | |
|---|---|---|
| JP | 2001-292143 | 10/2001 |
| JP | 2006-318071 | 11/2006 |

* cited by examiner

*Primary Examiner* — Yair Leibovich
(74) *Attorney, Agent, or Firm* — Staas & Halsey LLP

(57) ABSTRACT

A method for processing data includes storing a type information of a configuration element of a first data process system in association with an identification information of the configuration element in a configuration information storage part, determining the type information corresponding to a message output from the first data process system, the message including the identification information, comparing a first message group including a plurality of first messages and a second message group including a plurality of second messages, the plural second messages being stored in association with the type information of a second data process system in a message group storage part, determining whether the plural first messages match the plural second messages, and determining whether the type information of the plural first messages match the type information of the plural second messages when the plural first messages do not match the plural second messages.

10 Claims, 15 Drawing Sheets

FIG.6

| SUPERORDINATE TYPE | SUBORDINATE TYPE | CONFIGURATION ELEMENT NAME |
|---|---|---|
| Network | Router | svr001,avahi-deamon |
| App Server | Tomcat | svr001,smartd |
| Web Server | Apache | svr002,pcscd |
| System | Win | svr003,system |
| System | Unix | svr001,kernel |
| : | : | : |

FIG.7

| MESSAGE TYPE ID | MESSAGE CHARACTER STRING |
|---|---|
| 0 | Bridge firewalling registered. |
| 1 | Restoring network configuration. |
| 2 | Permission denied: /usr/local/apache/html/root_own.html pcfg_openfile: unable to check htaccess file, ensure it is readable |
| 3 | org.apache.catalina.core.ContainerBase$ContainerBackgroundProcessor processChildren<br>CRITICAL: Exception invoking periodic operation:<br>java.lang.OutOfMemoryError: GC overhead limit exceeded |
| : | : |

| START TIME | END TIME | FAILURE TIME |
|---|---|---|
| 8/11 13:41:20 | 8/11 17:50:22 | 1(HDD FAILURE) |
| ... | ... | ... |
| .. | .. | .. |

FIG.10

| FAILURE TYPE | PATTERN ID | MESSAGE PATTERN | | | | | | | | | | | | | | NUMBER OF APPEAR-ANCES | NUMBER OF FAILURES | BOTH OCCURRING PERCENTAGE |
|---|---|---|---|---|---|---|---|---|---|---|---|---|---|---|---|---|---|---|
| 1 (HDD FAILURE) | 1 | SUPERORDINATE TYPE | S | | | | | | | | | | | | | | | |
| | | SUBORDINATE TYPE | Lin | Win | Apa | Mys | Tom | | | | | | | | | | | |
| | | MESSAGE TYPE ID | 0 | 1 | 2 | 4 | 18 | | | | | | | | | 286 | 105 | 0.367 |
| | 2 | SUPERORDINATE TYPE | S | W | A | D | A | W | A | D | A | S | D | | | | | |
| | | SUBORDINATE TYPE | Lin | Win | Apa | Mys | Tom | Apa | Tom | Mys | Apa | Jet | Ora | Jet | Lin | Mys | | | |
| | | MESSAGE TYPE ID | 0 | 1 | 2 | 3 | 4 | 18 | 19 | 21 | 27 | 30 | 64 | 65 | 96 | 64 | 62 | 0.969 |
| | 3 | LARGE CATEGORY OF CONFIGURATION | S | W | A | D | A | W | A | D | A | | | | | | | |
| | | SMALL CATEGORY OF CONFIGURATION | Lin | Apa | Tom | Mys | Tom | Apa | Apa | Jet | Ora | Jet | | | | | | | |
| | | MESSAGE TYPE ID | 0 | 2 | 3 | 4 | 18 | 19 | 21 | 27 | 30 | 64 | | | | 140 | 103 | 0.736 |
| 2 (WEB DELAY) | 1 | LARGE CATEGORY OF CONFIGURATION | W | S | W | D | A | S | A | | | | | | | | | |
| | | SMALL CATEGORY OF CONFIGURATION | Apa | Win | Apa | Mys | Tom | Lin | Lin | Tom | | | | | | | | | |
| | | TYPE ID | 2 | 7 | 15 | 22 | 43 | 66 | 76 | 81 | | | | | | 665 | 486 | 0.731 |
| | 2 | LARGE CATEGORY OF CONFIGURATION | S | W | A | D | A | W | W | A | | | | | | | | |
| | | TYPE ID | Lin | Win | Apa | Tom | Mys | Tom | Apa | Apa | Jet | | | | | | | |
| | | MESSAGE TYPE ID | 0 | 1 | 2 | 3 | 4 | 18 | 19 | 21 | 27 | | | | | 533 | 502 | 0.942 |
| ... | | | | | | | | | | | | | | | | | | |

COMPUTER-READABLE RECORDING MEDIUM, APPARATUS, AND METHOD FOR PROCESSING DATA

CROSS-REFERENCE TO RELATED APPLICATIONS

This application is based upon and claims the benefit of priority of the prior Japanese Patent Application No. 2010-294282 filed on Dec. 28, 2010, the entire contents of which are incorporated herein by reference.

FIELD

The embodiments discussed herein are related to a computer-readable recording medium, an apparatus, and a method for processing data, for example, detecting a possibility of failure of a computer system.

BACKGROUND

Generally, a computer system is implemented with a mechanism for outputting various messages to a storage device for the purpose of, for example, analyzing a failure that occurred in the computer system. Further, a mechanism of automatically detecting the occurrence of a failure by monitoring messages output during operation is also considered to be implemented. For example, there is a mechanism of associating a group of messages that were output when failure occurred in the past (message patterns) with failure information and learning from the failure information associated with the message patterns. In a case where a new group of messages are output during operation, the mechanism compares the new group of messages with previous message patterns and determines whether there is a previous message pattern that matches the new group of messages. In a case where there is a matching message pattern, the failure information associated with the message pattern is reported to, for example, an administrator of the computer system.

However, the above-described mechanism may not be applicable to a different monitor target. That is, when the configuration (e.g., hardware configuration, software configuration) of the computer system to be monitored is different, the mechanism may not properly function. For example, in a case where system A and system B use different software pertaining to a given function, the messages output from the systems A and B are usually different. Therefore, it is difficult to detect a failure by comparing a group of messages output from the system B with message patterns learned by the system A. Therefore, in this case, the system A needs to learn the message patterns of the system B in addition to the message patterns of the system A.

SUMMARY

According to an aspect of the invention, there is provided a computer-readable recording medium on which a program for causing a computer to perform a data process method is recorded, the data process method including: storing a type information of a configuration element of a first data process system in association with an identification information of the configuration element in a configuration information storage part; determining the type information corresponding to a message output from the first data process system, the message including the identification information; comparing a first message group including plural first messages and a second message group including plural second messages, the plural second messages being stored in association with the type information of a second data process system in a message group storage part; determining whether the plural first messages match the plural second messages; and determining whether the type information of the plural first messages match the type information of the plural second messages when the plural first messages do not match the plural second messages.

The object and advantages of the invention will be realized and attained by means of the elements and combinations particularly pointed out in the claims.

It is to be understood that both the foregoing generation description and the followed detailed description are exemplary and explanatory and are not restrictive of the invention, as claimed.

BRIEF DESCRIPTION OF DRAWINGS

FIG. 6 is a schematic diagram illustrating an example of a configuration of a configuration information storage part according to an embodiment of the present invention;

FIG. 7 is a schematic diagram illustrating an example of a configuration of a message category dictionary storage part according to an embodiment of the present invention;

FIG. 10 is a schematic diagram illustrating a configuration of a message pattern dictionary storage part according to an embodiment of the present invention;

DESCRIPTION OF EMBODIMENTS

Figure 1:
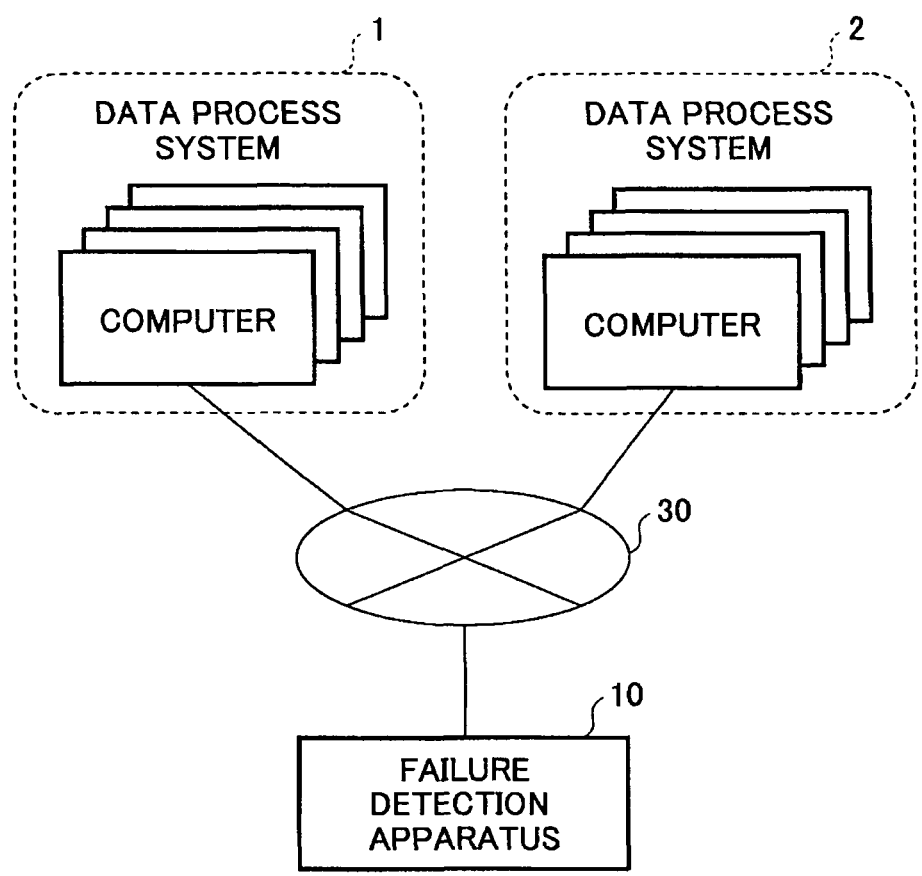
FIG. 1 is a schematic diagram illustrating a configuration of data process systems according to an embodiment of the present invention.

Embodiments of the present invention are described with reference to the drawings. FIG. 1 is a schematic diagram illustrating a configuration of data process systems 1 and 2 according to an embodiment of the present invention. In FIG. 1, the data process system 1, the data process system 2, and a failure detection apparatus 10 are communicably connected to each other via a network (e.g., LAN (Local Area Network) or the Internet).

The data process system 1 and the data process system 2 include one or more computers, respectively. In this embodiment, the content of the data processing performed by the data process system 1 and the data process system 2 is not to be limited in particular. It is, however, to be noted that, each of the configuration elements (programs) that constitutes the data process system 1 and the data process system 2 is configured to output a message in correspondence with the execution of a process. Further, at least a part of the configuration elements of the data process system 1 is different from a part of the configuration elements of the data process system 2.

The failure detection apparatus 10 detects the possibility of a failure occurring in the data process system 1 or the data process system 2 by monitoring messages output from the data process system 1 or the data process system 2. More specifically, the failure detection apparatus 10 has a function of associating a group of messages that were output when failure occurred (hereinafter also referred to as "message patterns") with information pertaining to failure (hereinafter also referred to as "failure information"), storing the message patterns associated with the failure information, and learning the message patterns (message pattern learning function). Further, the failure detection apparatus 10 has a function of detecting the possibility of the occurrence of a failure by comparing the message patterns learned from the message pattern learning function with a newly output group of messages.

In this embodiment, the failure detection apparatus 10 not only detects the possibility of a failure occurring in the data process system 1 but also detects the possibility of a failure occurring in the data process system 2 based on learned message patterns pertaining to the data process system 1. For example, the data process system 1 may be an existing system whereas the data process system 2 is a new system that is to begin operation.

Figure 2:
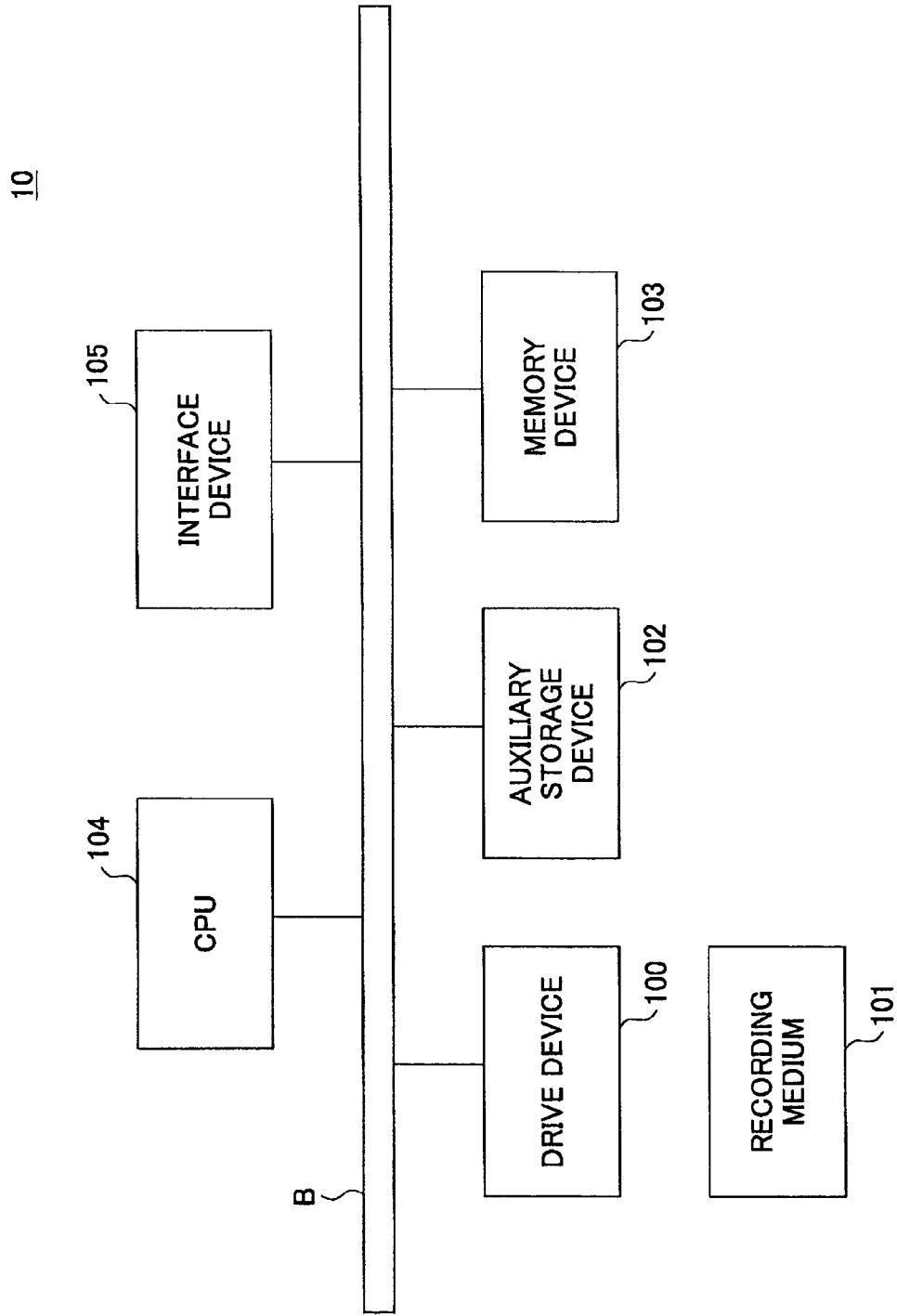
FIG. 2 is a schematic diagram illustrating a configuration of hardware of the failure detection apparatus according to an embodiment of the present invention.

FIG. 2 is a schematic diagram illustrating a configuration of hardware of the failure detection apparatus 10 according to an embodiment of the present invention. In this embodiment, the failure detection apparatus 10 includes, for example, a drive device 100, an auxiliary storage device 102, a memory device 103, a CPU (Central Processing Unit) 104, and an interface device 105 that are connected to each other by a bus B.

A program that executes a process of the failure detection apparatus 10 is provided to the failure detection apparatus 10 from a recording medium (computer-readable recording medium) 101 on which the program is recorded. When the recording medium 101 is set in the drive device 100, the program is installed from the recording medium 101 to the auxiliary storage device 102 via the drive device 100. It is, however, to be noted that, the program may be installed from a device other than the recording medium 101. For example, the program may be installed to the failure detection apparatus 10 by downloading the program from another computer via the network 30. The auxiliary storage device 102 not only has the installed program stored (retained) therein but also has other files and data stored therein.

In a case where activation (start) of the program is instructed, the memory device 103 reads out the program from the auxiliary storage device 102 and stores the program therein. The CPU 104 executes a function(s) of the failure detection device 10 in accordance with the program stored in the memory device 103. The interface apparatus 105 is used as an interface for connecting the failure detection apparatus 10 to the network 30.

The recording medium 101 may be a portable type recording medium such as a CD-ROM (Compact Disc Read-Only Memory), a DVD (Digital Versatile Disc), or a USB (Universal Serial Bus) memory. The auxiliary storage device 102 may be, for example, a HDD (Hard Disk Drive) or a flash memory. It is to be noted that the recording medium 101, the auxiliary storage device 102, or both are computer-readable recording media.

Figure 3:
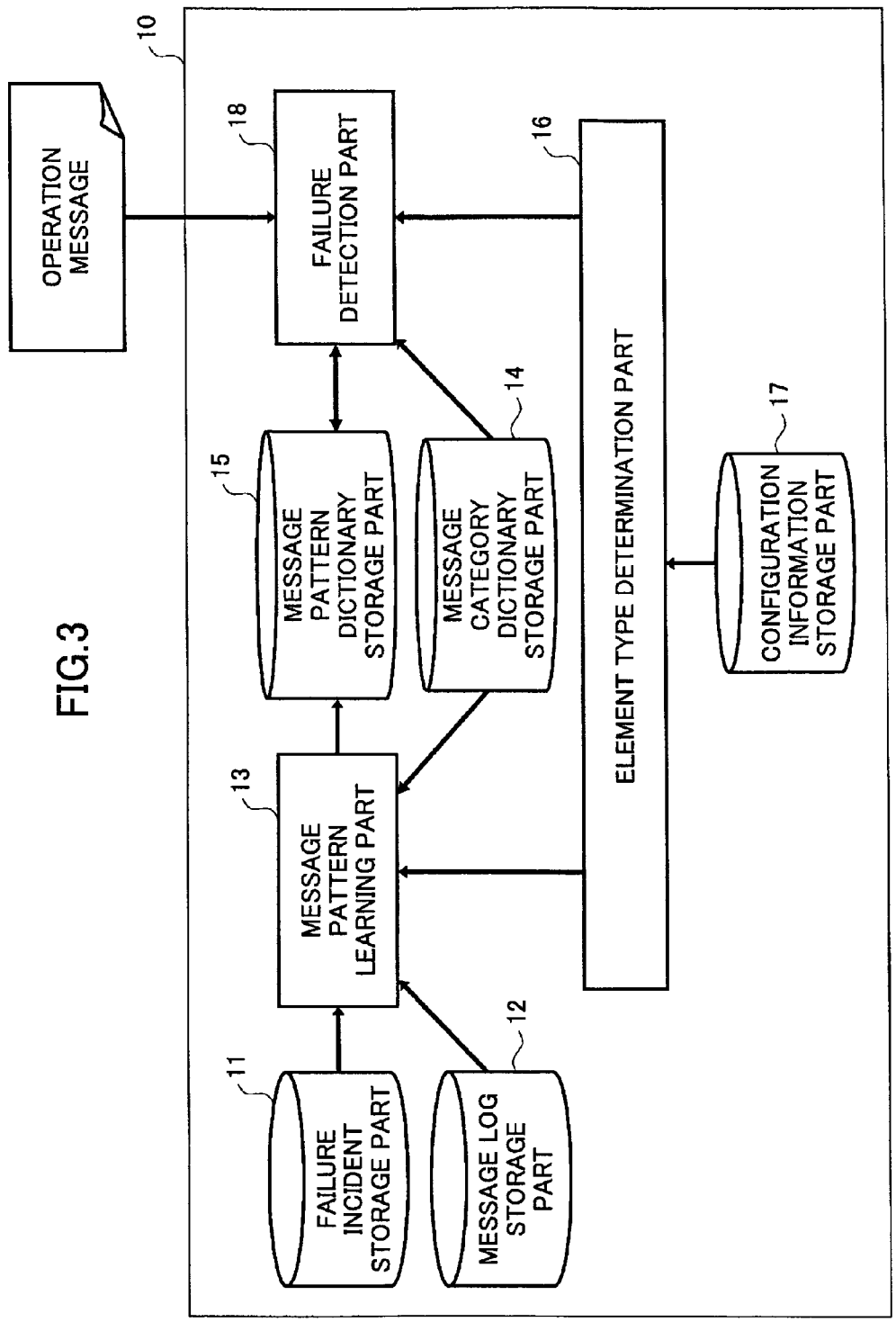
FIG. 3 is a schematic diagram illustrating a configuration of function parts of the failure detection apparatus according to an embodiment of the present invention.

FIG. 3 is a schematic diagram illustrating a configuration of function parts of the failure detection apparatus 10 according to an embodiment of the present invention. The failure detection apparatus 10 includes, for example, a failure incident storage part 11, a message log storage part 12, a message pattern learning part 13, a message category dictionary storage part 14, a message pattern dictionary storage part 15, an element type determination part 16, a configuration information storage part 17, and a failure detection part 18.

The functions of the failure incident storage part 11, the message log storage part 12, the message category dictionary storage part 14, the message pattern dictionary storage part 15, and the configuration information storage part 17 are performed by using the auxiliary storage device 102. Alternatively, the functions of the aforementioned storage parts 12, 14, 15, and 17 may be executed by using a storage device connected to the failure detection apparatus 10 via the network 30.

The functions of the message pattern learning part 13, the element type determination part 16, and the failure detection part 18 are performed by processes executed by the CPU 104 of the failure detection apparatus 100 in accordance with a program(s) installed in the failure detection apparatus 10.

The failure incident storage part 11 retains (stores) history information pertaining to failures that had occurred in the past in the data process system 1. The message log storage part 11 retains (stores) a log (history) of messages output from each configuration element (program) of the data process system 1.

The message category dictionary storage part 14 associates a message character string to an identifier indicating a type of message (message type ID) and retains (stores) the message character string in association with a corresponding type of message. In this embodiment, the message type ID is a numeral. Alternatively, other symbols (e.g., alphabet letters) may be used as the message type ID. The information (data) stored in the message category dictionary storage part 14 is used to categorize (numerically express) messages by using a method of clustering character strings.

The configuration information storage part 17 associates information indicating a type of configuration element (type information) to identification information of each configuration element of the data process system 1 or the data process system 2 and retains (stores) the type information in association with the identification information of each configuration element of the data process system 1 or the data process system 2. The value of the type of the configuration element differs depending on the abstraction level of the criterion used for categorizing the types of configuration elements. For example, in a case where the criterion for the categorization is the name of a program (program name), the program name is the value of the type of the configuration element. Alternatively, in a case where the criterion for the categorization is the function of a program (e.g., Web server function, application server function, database function), the character string (function name) indicating the function of the program is the value of the type of the configuration element. The configuration information storage part 17 retains (stores) plural type information having different abstraction levels in correspondence with each configuration element (program).

The element type determination part 16 determines the type information of a configuration element from which a message is originally output (output origin of message) by using the configuration information storage part 17. The determination is performed on the messages stored in the message log storage part 12 and an operation message. It is to be noted that the operation message is a message input to the failure detection apparatus 10 when the data process system 1 or the data process system 2 are operating.

The message pattern learning part 13 learns a message pattern output when a failure occurs by using, for example, the failure incident storage part 11 and the message log storage part 12. More specifically, the message pattern learning part 13 identifies a message group (group of messages) output from each configuration element of the data process system 1 during a period when failure is occurring by comparing the information stored in the failure incident storage part 11 and the information stored in the message log storage part 12 and determining whether there is a match between the information stored in the failure incident storage part 11 and the information stored in the message log storage part 12. The message pattern learning part 13 converts each message included in the identified message group into a group of message type IDs (message pattern) based on the message category dictionary storage part 14. The message pattern learning part 13 associates the message pattern to failure information pertaining to the failure and stores (records) the message pattern in association with the failure information in the message pattern dictionary storage part 15. The element type determination part 16 determines type information of a configuration element with respect to each message and assigns the type information to each message type ID (i.e. to each message).

The failure detection part 18 performs a matching operation by comparing a group of operation messages (operation message group) and message patterns stored in the message pattern dictionary storage part 15 and then determining whether there is a match between the group of operation messages and one or more message patterns stored in the message pattern dictionary storage part 15. More specifically, the failure detection part 18 converts the operation message group into a number sequence (e.g., a message pattern) by using the message category dictionary storage part 14. Then, the failure detection part 18 determines whether there is a match between the message pattern obtained by converting the operation message group and one or more message patterns stored in the message pattern dictionary storage part 15, to thereby detect a possibility of a failure occurring in the data process system 1 or the data process system 2. In this embodiment, the content of the information initially retained (stored) in the message pattern dictionary storage part 15 is learning results based on a message log of the data process system 1. Therefore, the possibility for the message pattern of the operation message group output from the data process system 2 to match one or more of the message patterns stored in the message pattern dictionary storage part 15 is low. In other words, the possibility of detecting failure of the data process system 2 by comparing the message patterns is low. Accordingly, in a case where the message pattern of the operation message group has a portion that does not match with a portion of a corresponding message pattern stored in the message pattern dictionary storage part 15, the failure detection apparatus 10 compares the type information assigned to the portions of the message patterns being compared. That is, the matching operation is performed by increasing the abstraction level of the portions of the message patterns being compared. By increasing the abstraction level of the portions of the message patterns being compared, the failure detection apparatus 10 can detect the possibility of a failure occurring in the data process system 2 by using a learned message pattern pertaining to information of the data process system 1.

Next, processes performed by the failure detection apparatus 10 according to an embodiment of the present invention are described. First, an example of an operation of learning message patterns by the failure detection apparatus 10 is described.

Figure 4:
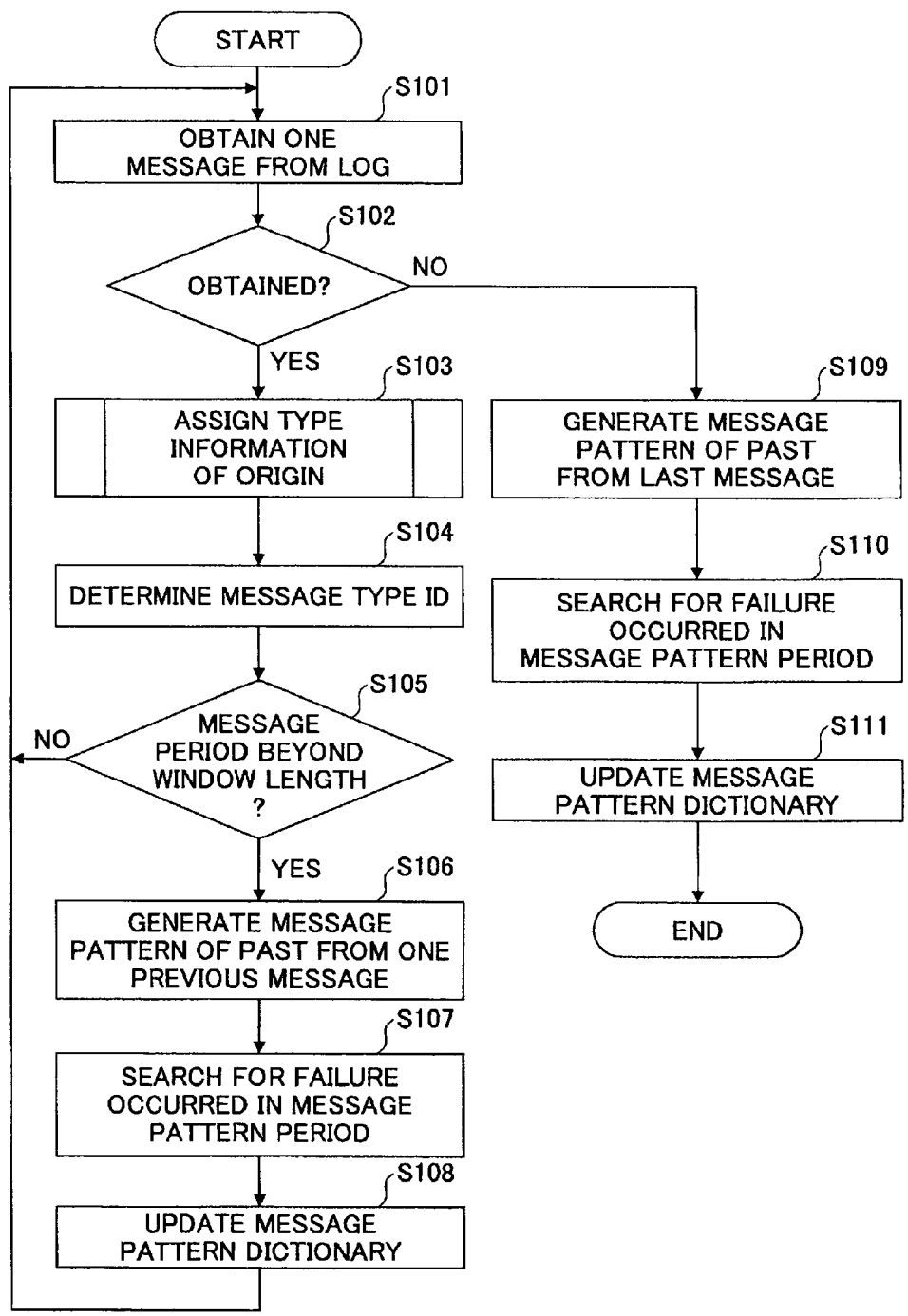
FIG. 4 is a flowchart for describing processes of a message pattern learning operation according to an embodiment of the present invention.

FIG. 4 is a flowchart for describing processes of a message pattern learning operation according to an embodiment of the present invention.

In Step S101, the message pattern learning part 13 loads a single message from the message log storage part 12 to the memory device 103. The message loaded to the memory device 103 is hereinafter also referred to as "target message".

Figure 5:
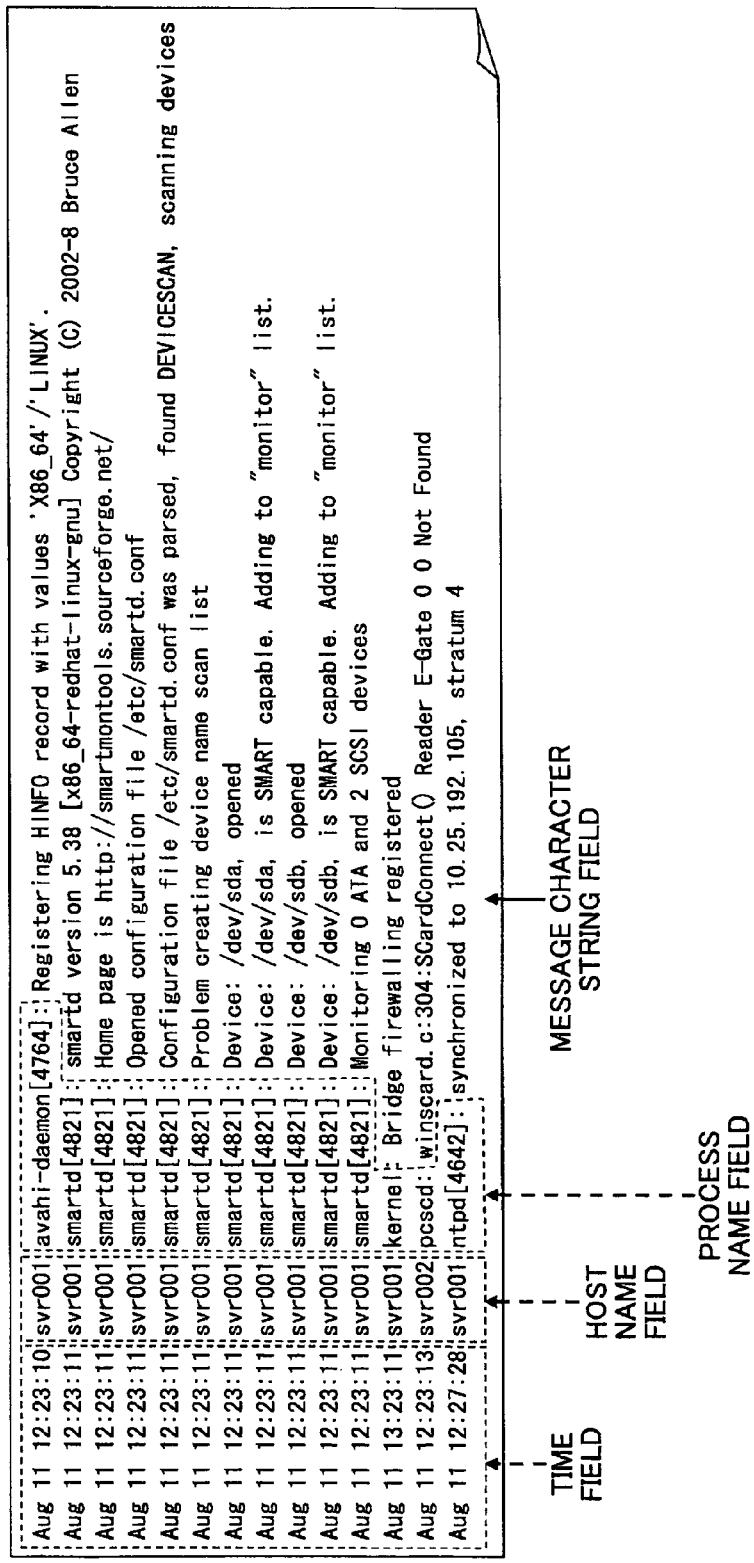
FIG. 5 is a schematic diagram illustrating an example of a message log recorded in a message log storage part according to an embodiment of the present invention.

FIG. 5 is a schematic diagram illustrating an example of a message log recorded (stored) in the message log storage part 12 according to an embodiment of the present invention.

In the message log of FIG. 5, a single line of the message log corresponds to a single message. Each message includes, for example, a time field, a host name field, a process name field, and a message character string field. The time field is a field (item) including a character string indicating the time that a message is output (or recorded to the message log storage part 12). The host name field is a field including the host name of, for example, a computer or a network device containing a configuration element such as a program (output origin) from which a message is originally output. The process name field is a field including a name of a process (process name) of a program from which a message is originally output. The process name is recorded in a format of <program name> [<process ID>]. The brackets "< >" represents that an item indicated inside the brackets < > is to be replaced with a specific value. The message character string field is a field including a character string indicating a message that is output. It is to be noted that the combination of the value of the host name field and the value of the process name field described in this embodiment is an example of identification information of a configuration element.

Accordingly, a message of a single line is loaded from the messages of the message log in Step S101.

In a case where the message is loaded (i.e. a case where the end of the message log is not yet reached) (Yes in Step S102), the element type determination part 16 obtains the type information of the configuration element such as a program (output origin) from which the target message is originally output. The type information of the configuration element is obtained from the configuration information storage part 17. Then, the element type determination part 16 assigns the obtained type information to the target message (Step S103). The assigning of the type information to the target message is, for example, recording type information in association with the target message to the memory device 103.

FIG. 6 is a schematic diagram illustrating an example of a configuration of the configuration information storage part 17 according to an embodiment of the present invention. As illustrated in FIG. 6, the configuration information storage part 17 retains (stores) superordinate types, subordinates types, and configuration element names in correspondence with each configuration element of the data process system 1 or the data process system 2.

The configuration element name is an identification name for uniquely identifying the configuration elements of the data process systems 1 and 2. In this embodiment, the configuration element name is indicated in a format including a <host name> and a <program name>. Accordingly, even if the programs are actually the same, the configuration element names of the programs, being operated in different computers, are different. In this embodiment, "superordinate type" and "subordinate type are examples of the type information of the configuration elements. The subordinate type has an abstraction level lower than that of the superordinate type (i.e. concrete level higher than that of the superordinate type) or a category range smaller than that of the superordinate type. In this embodiment, the value of the subordinate type (hereinafter also referred to as "subordinate type name") is the name of the product (product name) of a program. In a case where a device and a program (configuration element) have a one on one relationship, the type name of the device may be the value of the subordinate type. For example, the value of the subordinate type in the first line is indicated as "Router". Because a router and a program have a one on one relationship (basically operated with a single program (OS (Operating System)), the type name of the device is assumed as the value of the subordinate type.

The superordinate type has an abstraction level lower than that of the subordinate type (i.e. concrete level lower than that of the subordinate type) or a category range larger than that of the subordinate type. In this embodiment, the value of the superordinate type (hereinafter also referred to as "superordinate type name") is the name of a function (function name) of a program. It is, however, to be noted that a type name of a device having a high abstraction level may be assumed as the value of the superordinate type in a case where the value of the subordinate type is a configuration element corresponding to a type name of a device. For example, the value of the superordinate type in the first line is indicated as "Network (network device)".

Then, the message pattern learning part 13 determines a type of the target message by using the message category dictionary storage part 14 and obtains a message type ID corresponding to the determined type from the message category dictionary storage part 14 (Step S104). The message pattern learning part 13 records the obtained message type ID in association with the target message in the memory device 103.

FIG. 7 is a schematic diagram illustrating an example of a configuration of the message category dictionary storage part 14 according to an embodiment of the present invention. As illustrated in FIG. 7, the message category dictionary storage part 14 retains message type IDs in correspondence with message character strings. In Step S104, the message pattern learning part 13 searches for a message character string that is similar to or identical to the value in the message character string field of the target message by using a character string clustering method. The message pattern learning part 13 obtains a message type ID corresponding to the searched message character string from the message category dictionary storage part 14. In one example of the character string clustering method, a character string is determined to be similar to another character string if the match between the character strings is equal to or greater than a predetermined percentage. In a case where a character string that is similar or identical (matching) to the value of the message character string field of the target message is not found in the search, the message pattern learning part 13 records the value of the message character string field of the target message in the message category dictionary storage part 14. In this case, the message pattern learning part 13 records the value of the message character string field of the target message as a message character string corresponding to a new type. When recording the value of the message character string field of the target message, a new message type ID is assigned to the message character string to be recorded in correspondence with a new type.

The steps S101-S104 are executed until a period of the group of messages loaded from the message log storage part 12 exceeds a window width (Step S105). The period of the group of messages loaded from the message log storage part 12 is a period beginning from the time of the oldest message among the group of messages and terminating at the time of the newest message among the group of messages. Further, the window width is a maximum length of time in which a message pattern is divided.

Figure 8A:
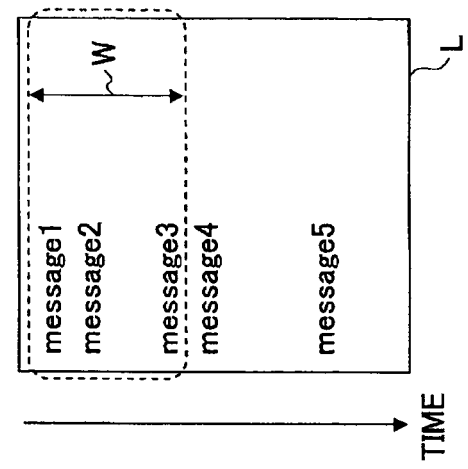
FIGS. 8A-8C are schematic diagrams for describing a window length according to an embodiment of the present invention.
Figure 8B:
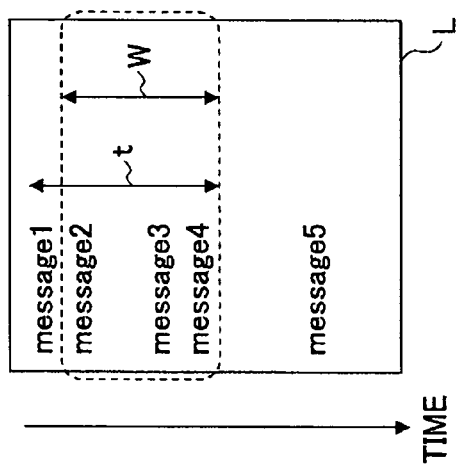
Figure 8C:
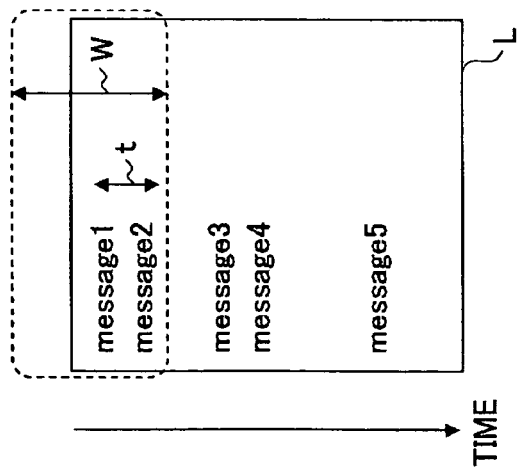

FIGS. 8A-8C are schematic diagrams for describing the window length according to an embodiment of the present invention. In FIGS. 8A-8C, "message N (N being an integer)" in a message log L represents a single message. In the message log L, each message is allocated at a position corresponding to a time indicated in a time field thereof. For example, as illustrated in FIGS. 8A-8C, the state in which a message 2 and a message 3 are separated from each other indicates that the time of message 2 and the time of message 3 are separated.

FIG. 8A illustrates a relationship between a period t of a group of loaded messages and a window width W in a case where messages 1 and 2 are loaded. In other words, FIG. 8A illustrates a state where the steps S101-S104 are performed twice. In this state, the period t has not exceeded the window width W. Therefore, the steps S101-S104 are repeated. In FIGS. 8A-8C, the window length W moves downward as the steps S101-S104 are repeated.

FIG. 8B illustrates a relationship between a period t of a group of loaded messages and a window width W in a case where messages 1 and 4 are loaded. In this state, the period t exceeds the window width W. Accordingly, the operation of FIG. 4 proceeds to Step S106.

In Step S106, the message pattern learning part 13 generates a message pattern (a group of message type IDs) pertaining to a group of messages (message group) included in a return period (retroactive period). The return period has a length equivalent to the window width W. The return period is a period that is returned (shifted) one message backward with respect to a target message. For example, in a case of performing the Step S106 in a state illustrated in FIG. 8B, the message pattern learning part 13 generates a message pattern pertaining to a group of messages 1-3 included in the return period as illustrated in FIG. 8C. As illustrated in FIG. 8C, the return period has a length equivalent to the window width W and is returned one message backward from respect to the message 4. Accordingly, in case where the message type ID of the message 1 is "10", the message type ID of the message 2 is "5", and the message type ID of the message 3 is "26", the message pattern learning part 13 generates a message pattern of "5, 10, 26". The message pattern includes type information assigned to each message (each message type ID) in Step S103. That is, a message pattern includes a group of message IDs and a group of type information. The message pattern generated in Step S106 is hereinafter also referred to as "target message pattern".

It is to be noted that the order in which messages (message type IDs) are output (aligned) in the message pattern is not to be limited in particular. In this embodiment, the message type IDs are aligned in the message pattern in an ascending order for the sake of convenience.

Then, in Step S107, the message pattern learning part 13 refers to the failure incident storage part 11 and searches for a failure incident occurring in a period of the target message pattern. The period of the target message pattern is a period beginning from the time of the oldest message among the group of messages in the target message pattern and terminating at the time of the newest message among the group of messages in the target message pattern.

Figure 9:
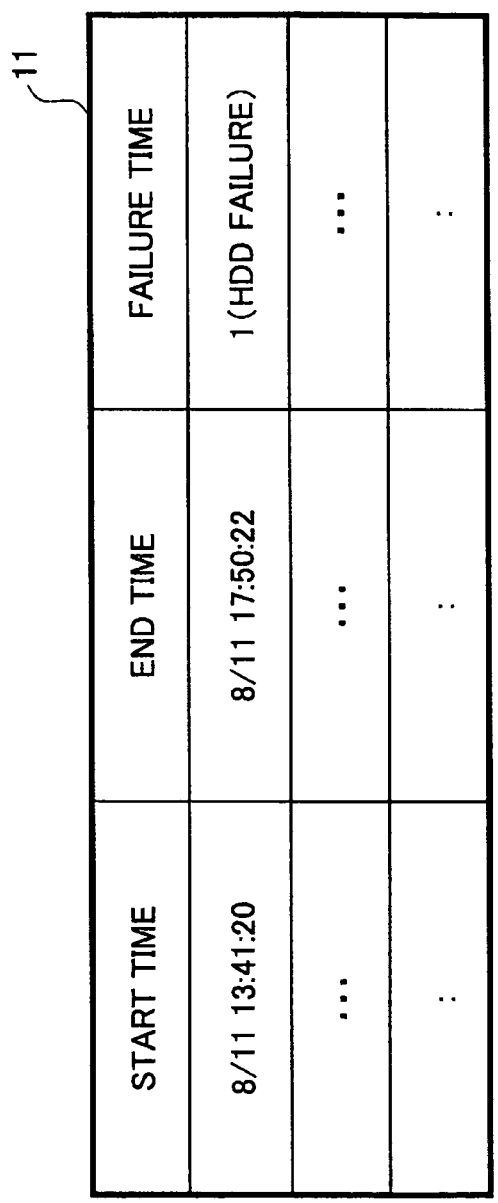
FIG. 9 is a schematic diagram illustrating a configuration of a failure incident storage part according to an embodiment of the present invention.

FIG. 9 is a schematic diagram illustrating a configuration of a failure incident storage part 11 according to an embodiment of the present invention. As illustrated in FIG. 9, the failure incident storage part 11 retains (stores) items such as "start time", "end time", and "the failure type" in correspondence with failure incidents that occurred in the past.

In FIG. 9, "start time" indicates the time in which a failure began or the estimated time in which a failure began. Further, "end time" of FIG. 9 indicates the time in which a failure ended or the estimated time in which a failure ended. The time (period) between the start time and the end time is hereinafter referred to as "failure period". Further, "failure type" indicates an identifier of the type of failure. The records stored in the failure incident storage part 11 are registered by, for example, a system administrator.

In Step S107, the message pattern learning part 13 searches for a record including a failure period that matches the period of the target message pattern or a record including a failure period that contains the period of the target message pattern. The failure incident included in the searched record is hereinafter referred to as "target failure incident".

Then, the message pattern learning part 13 updates the message pattern dictionary storage part 15 based on the target failure incident and the target message pattern (Step S108).

FIG. 10 is a schematic diagram illustrating a configuration of the message pattern dictionary storage part 15 according to an embodiment of the present invention. As illustrated in FIG. 10, the message pattern dictionary storage part 15 retains (stores) one or more records containing values of failure types (hereinafter also referred to as "failure incident record") in correspondence with failure types. For example, FIG. 10 illustrates a failure type record having a failure type of "1" and another failure type record having a failure type "2". Each failure incident record includes a record corresponding to one or more message patterns (hereinafter referred to as "message pattern record"). The message pattern record includes items such as "pattern ID", "message pattern", "number of appearances", "number of failures", and "both occurring percentage".

The item "pattern ID" indicates an identifier that is unique to each message pattern belonging to the same failure type. The message pattern includes a message type ID, a subordinate type, and a superordinate type respectively corresponding to each message included in the message pattern. The items "subordinate type" and the "superordinate type" indicate information pertaining to the type of constitution element assigned by the element type determination part 16.

The item "number of appearances" indicates the number of times in which the same message pattern has appeared in the past (i.e. the number of times in which the same message pattern had been detected in the past). The item "number of failures" indicates the number of times in which a failure had actually occurred when the failure was detected (i.e. the number of times in which the actual occurrence of a failure was confirmed when the failure was detected). The item "both occurring percentage" indicates a value obtained by dividing the "number of failures" by the "number of appearances". In other words, the item "both occurring percentage" indicates the percentage in which a failure occurred when a corresponding message pattern was detected. It is to be noted that the values of the superordinate type and the subordinate type are indicated in FIG. 10 in an abbreviated manner with respect to the values indicated in FIG. 6. The reason that the length of the message patterns is not necessarily constant (uniform) is because the message patterns are divided based on window width whereas the interval of outputting each message is not always constant.

In Step S108, the message pattern learning part 13 adds a value "1" to the "number of appearances" in the record of the message pattern matching the target message pattern inside the message pattern dictionary storage part 15. In this embodiment, whether the target message pattern matches a message pattern is determined based on a group of message type IDs (message type ID group) of a message pattern. Accordingly, the target message pattern is determined to match a message pattern when the message type ID group of the target message pattern matches a message type ID group of the message pattern. In this embodiment, the order in which the message type IDs is arranged is not taken into consideration.

Among the message pattern records that match the target message pattern, the message pattern learning part 13 adds a value "1" to the "number of failures" in a message pattern record corresponding to the failure type of the target failure incident in a case where the target failure incident is being searched in Step S107. After the "number of appearances" and the "number of failures" are updated, the message pattern learning part 13 updates "both occurring percentage" of a message pattern record in which at least one of the "number of appearances" and the "number of failures" is updated.

In a case where the target message pattern does not match with any of the message pattern records, the message pattern learning part 13 adds a message pattern record indicating the target message pattern to a failure incident record pertaining to the failure type of the target failure incident. In this case, a value "1" is recorded in the item "number of appearances", a value "1" is recorded in the item "number of failures", and a value "1.0" is recorded in the item "both occurring percentage" of the added message pattern record.

When the steps S101-S108 are repeated until the end of the message log storage part 12 is reached (No in Step S102), the message pattern learning part 13 performs the processes of the Steps S106-S108 on the last message of the message log storage part 12 (Step S109-S111). Then, the operation of FIG. 4 is terminated.

Figure 11:
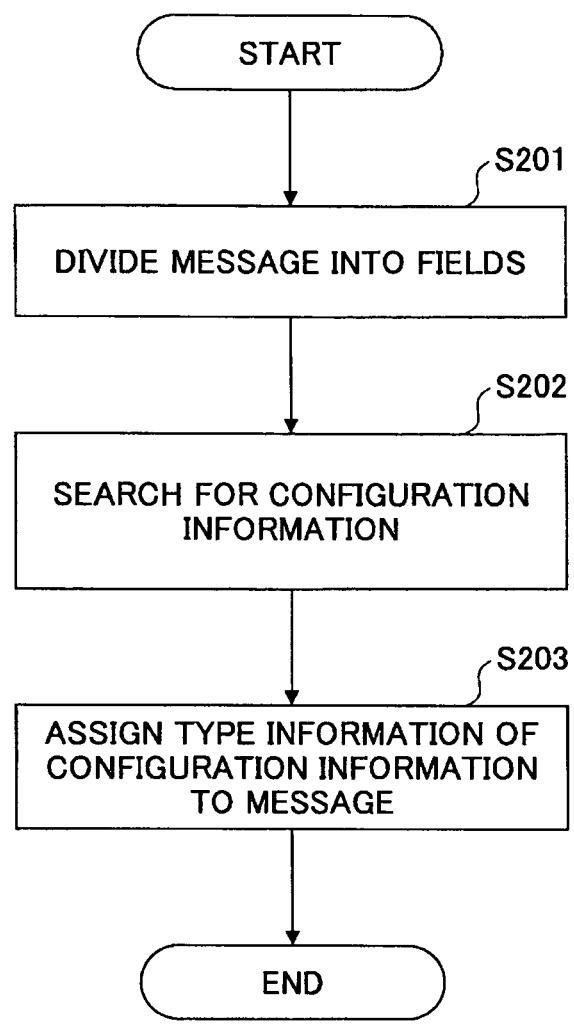
FIG. 11 is a flowchart for describing an operation of assigning type information of a configuration element according to an embodiment of the present invention.

Next, the Step S103 is described in further detail. FIG. 11 is a flowchart for describing an operation of assigning type information (type information assignment operation) of a configuration element according to an embodiment of the present invention.

In Step S201, the element type determination part 16 divides the target message into units of fields. Then, the element type determination part 16 searches for configuration information stored (retained) in the configuration information storage part 17. The configuration information is a record pertaining to a name of a configuration element including the value of a host name field and a value (excluding "process ID" indicated inside brackets [ ]) of a process name field. Then, the element type determination part 16 assigns subordinate and superordinate type names included in the searched record to the target message (Step S203).

Next, an operation of detecting the possibility of a failure occurring in the data process system 2 by using the message pattern dictionary storage part 15 (including message patterns generated in the operation illustrated in FIG. 4) is described.

In the following description, a message pattern recorded in the message pattern dictionary storage part 15 is referred to as "learning pattern".

Figure 12:
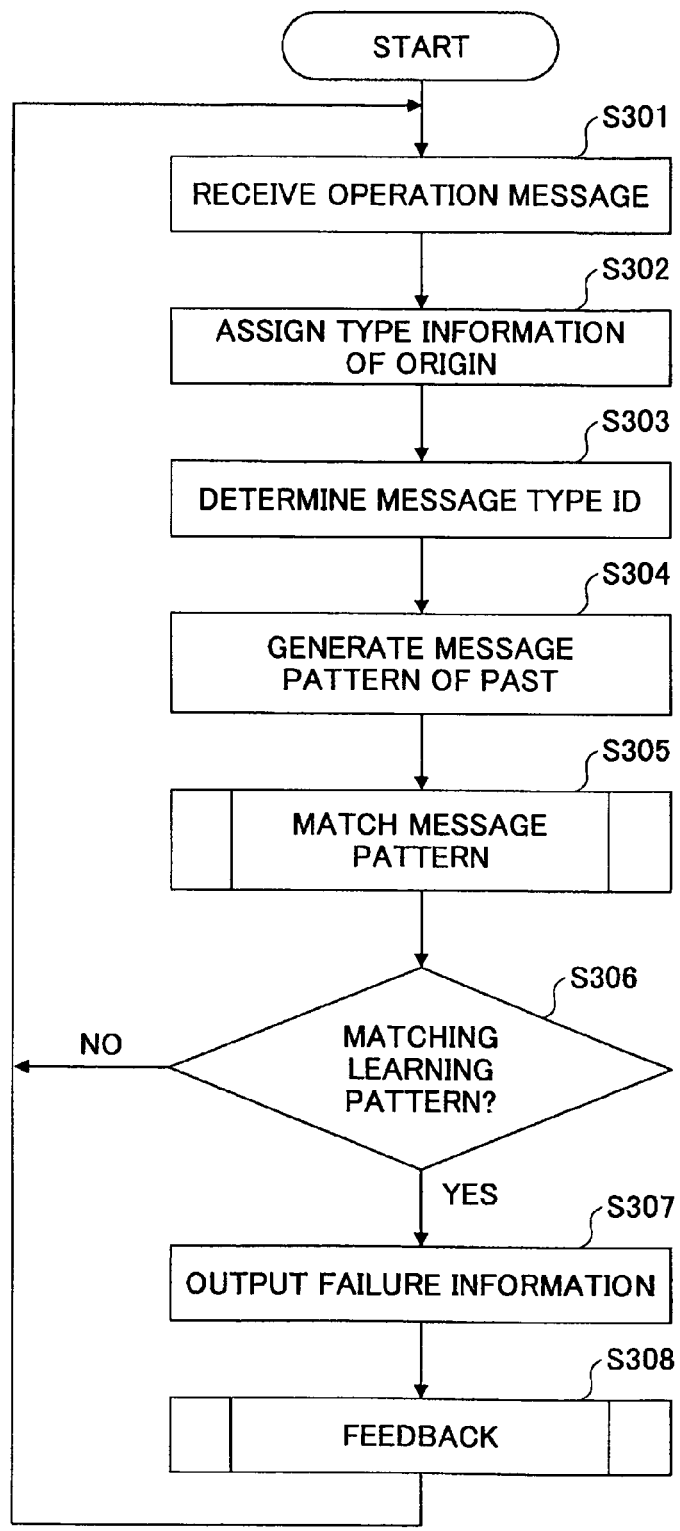
FIG. 12 is a flowchart for describing processes of a failure detection operation according to an embodiment of the present invention.

FIG. 12 is a flowchart for describing processes of a failure detection operation according to an embodiment of the present invention.

In Step S301, the failure detection part 18 receives an operation message from the data process system. The failure detection part 18 records the received message pattern (hereinafter also referred to as "target operation message") to, for example, the memory device 103. In this embodiment, it is assumed that the operation message has the same format as the one or more messages stored in the message log storage part 12.

It is to be noted that, in general, the format of a message is different from another message if the output origins of the messages are different. In this embodiment, each of the output origins of the messages has a conversion part that can convert the formats of a message into a message format that is commonly used among the output origins (configuration elements).

Then, the element type determination part 16 obtains the type information of the configuration element from which the target operation message is output, from the configuration information storage part 17 and assigns the obtained type information to the target message (Step S302). The processes performed in the type information assignment operation of FIG. 11 may be performed in Step S302.

Then, the failure detection part 18 determines the type of the target operation message by using the message category dictionary storage part 14 and obtains a message type ID indicating the determined type from the message category dictionary storage part 14 (Step S303). The failure detection part 18 records the obtained message type ID in association with the target operation message to the memory device 103. The process performed in Step S104 of the message pattern learning operation of FIG. 4 may be performed in Step S303.

Then, the failure detection part 18 generates a message pattern (group of message type IDs) corresponding to a group of operation messages received within a period (equivalent to a window width W) retroactively returning from the timing when the target operation message is received (Step S304). The process performed in Step S106 of the message pattern learning operation of FIG. 4 may be performed in Step S304. The message pattern generated in Step S304 is hereinafter also referred to as "target operation message pattern".

Then, the failure detection part 18 executes a message pattern matching process (Step S305). That is, the failure detection part 18 searches a learning pattern that matches the target operation message pattern from the message pattern dictionary storage part 15.

In a case where a learning pattern that matches the target operation message pattern is found by the search (Yes in Step S306), the failure detection part 18 outputs information pertaining to a failure incident associated to the found learning pattern (Step S307). In this embodiment, the information output from the failure detection part 18 is a detection result indicating the possibility of the occurrence of a failure detected (determined) by the failure detection part 18. The failure incident associated to the learning pattern is a failure incident of a failure incident record including a message pattern record of the learning pattern. The information pertaining to the failure incident may be, for example, the value of a failure type of the failure incident record, a pattern ID of the learning pattern, and the value of the both occurring percentage of the message pattern of the learning pattern. By referring to the output information, an administrator or the like can predict a failure and the possibility of the occurrence of the failure. The method of outputting the information pertaining to the failure incident is not limited in particular. For example, the information pertaining to the failure incident may be output by being displayed on a display device connected to the failure detection apparatus 10, by being printed with a printer, or by being transmitted to an address of the administrator or the like with electronic mail.

In Step S308, the failure detection part 18 records the content of the target operation message pattern in association with the learning pattern (searched in Step S305) to, for example, the auxiliary storage device 102. The information recorded in the auxiliary storage device 102 is to be used in the following feedback process.

Then, the failure detection part 18 performs the feedback process (Step S308). That is, the failure detection part 18 receives information such as information indicating the validity of the information output in Step S307 and updates the message patterns in the message pattern dictionary storage part 15 based on the received information.

On the other hand, in a case where a learning pattern that matches the target operation message pattern is not found (No in Step S306), the processes in Steps S307 and S308 are not performed.

Figure 13:
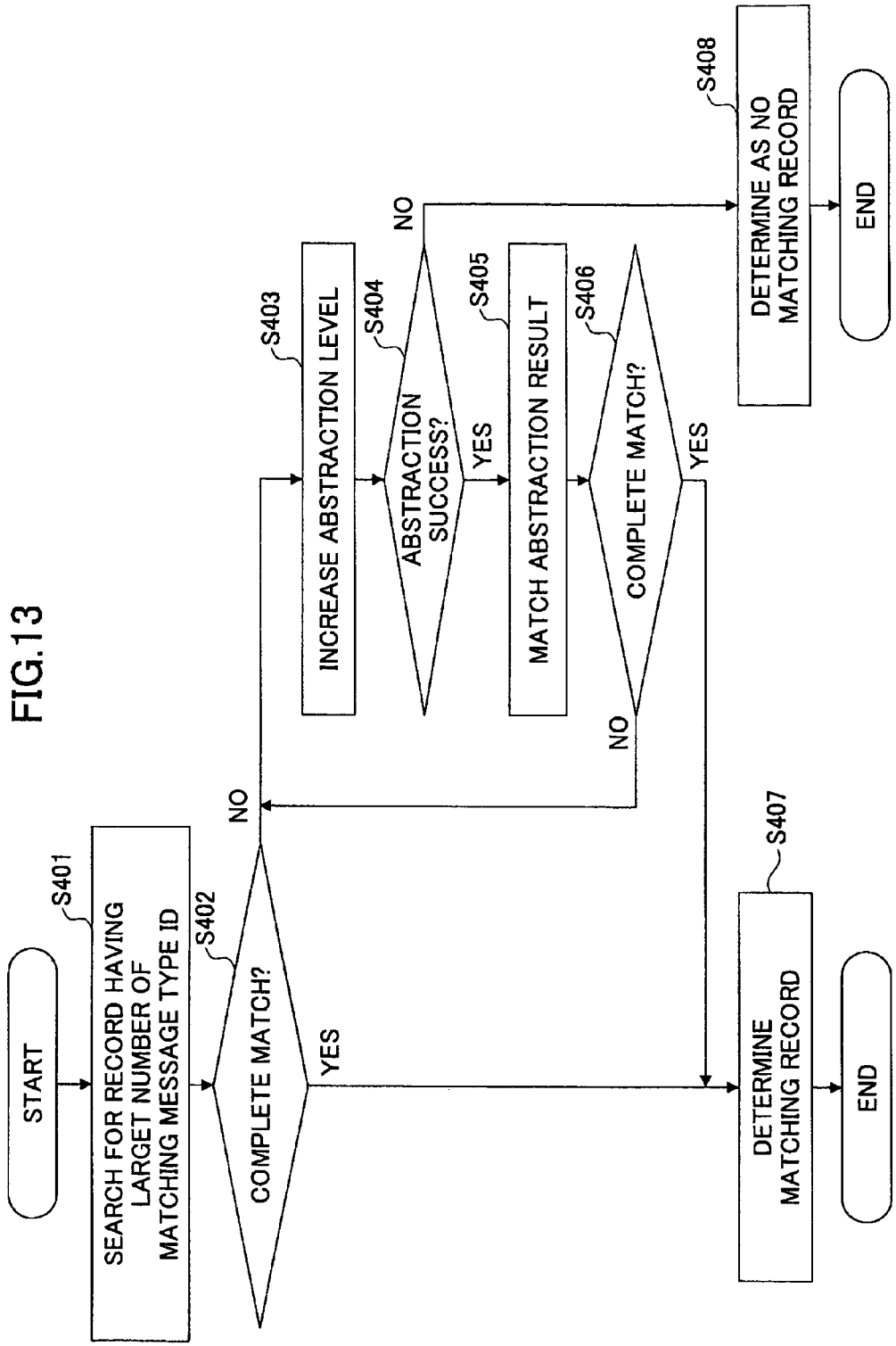
FIG. 13 illustrates a flowchart of a message pattern matching operation according to an embodiment of the present invention.

Next, the process of Step S305 is described in further detail. FIG. 13 illustrates a flowchart of a message pattern matching operation according to an embodiment of the present invention.

In Step S401, the failure detection part 18 searches for a message pattern record having the largest number of message type IDs that match those of the target operation message pattern from the message pattern dictionary storage part 15.

In a case where a learning pattern of the message pattern record found in the search of Step S401 (hereinafter also referred to as "target learning pattern") has a group of message type IDs that completely match those of the message type IDs of the target operation message pattern (Yes in Step S402), the failure detection part 18 outputs the target learning pattern P1 as a search result (S407).

On the other hand, in a case where the group of message type IDs of the target learning pattern and the group of the message type IDs of the target operation message pattern do not completely match (i.e. include different messages) (No in Step S402), the failure detection part 18 increases the abstraction level of a target to be compared (comparison target) in the messages (Step S403).

Figure 14:
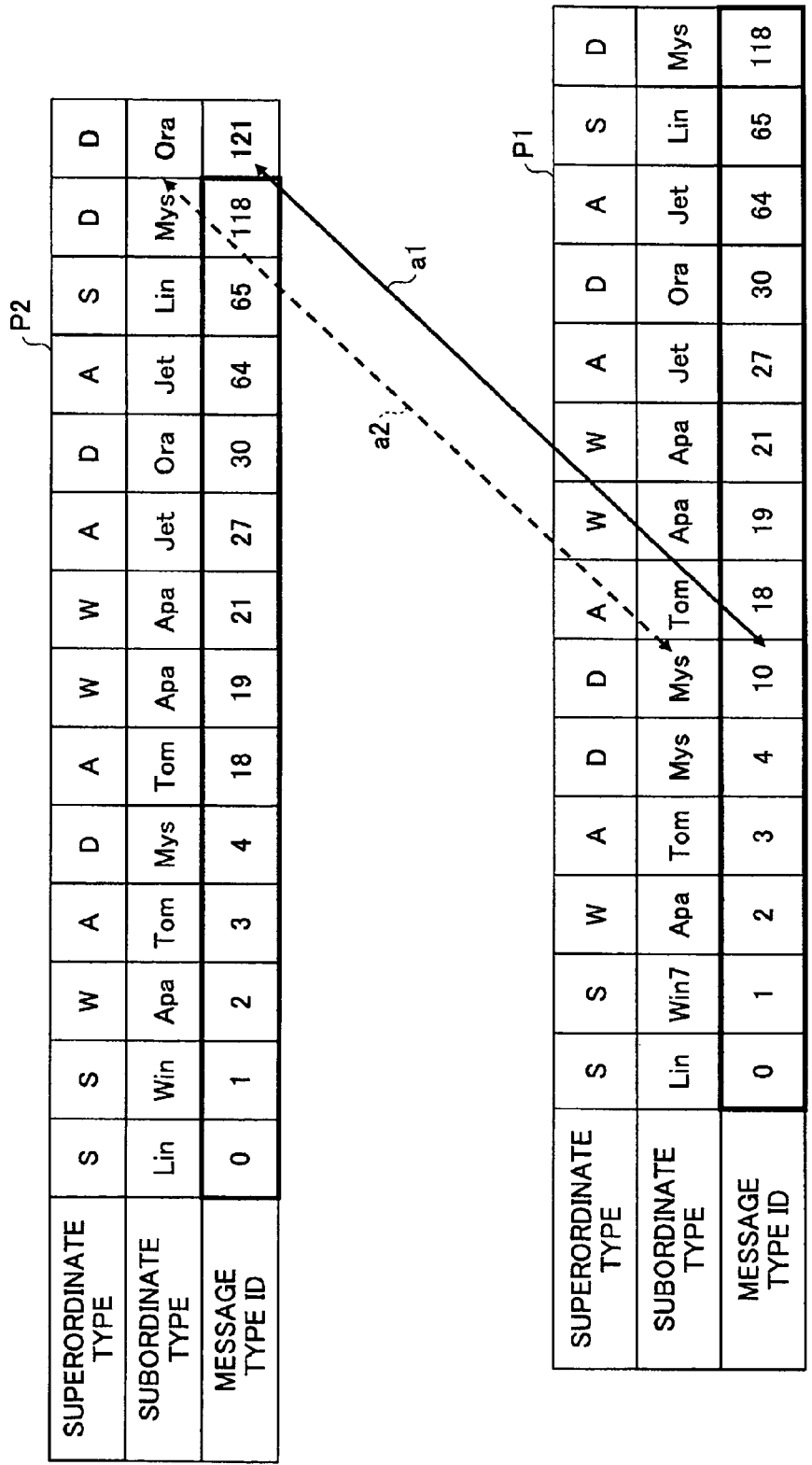
FIG. 14 is a schematic diagram for describing a process of performing abstraction on comparison targets.

FIG. 14 is a schematic diagram for describing a process of performing abstraction on comparison targets. In FIG. 14, a pattern P1 is an example of the target learning pattern and a pattern P2 is an example of the target operation message pattern. The contents of the patterns P1 and P2 are sorted in accordance with message type ID. It is to be noted that, in FIG. 14, the values of the subordinate type and the superordinate type are abbreviated compared to the values illustrated in FIG. 6 for the sake of convenience.

In FIG. 14, the pattern P1 and the pattern P2 include corresponding portions (messages) that have different message type IDS. The corresponding portions (messages) of the patterns P1 and P2 are indicated by the arrow-heads of a solid line arrow in FIG. 14. That is, the message type ID in the corresponding portion of the pattern P1 is "10" whereas the message type ID in the corresponding portion of the pattern P2 is "121". Accordingly, in Step S403, the comparison targets are changed from message type IDs in the corresponding portion to subordinate types in the corresponding portion as indicated by the arrow-heads of a dotted line arrow in FIG. 14. This process is referred to as an abstraction process of the comparison targets. In a case where there are plural corresponding portions having different message type IDs, the abstraction process is performed on the comparison targets in the plural corresponding portions.

In other words, even in a case where the message type IDs (i.e. character strings of messages) of the target learning pattern P1 and the target operation message pattern P2 do not match, there is a possibility that the content of messages (i.e. failure occurring at each output origin) of the target learning pattern P1 and the target operation message pattern P2 may match if there is a match between the type of output origin of the message corresponding to the message type ID of the target learning pattern P1 and the type of output origin of the message corresponding to the message type ID of the target operation message pattern P2. Accordingly, in this embodiment, in a case where the message type IDs do not match, the types of the output origin are compared.

In a case where the abstraction process can be performed on the comparison targets in the corresponding portions having different message type IDs (Yes in Step S404), the failure detection part 18 compares the comparison targets subjected to the abstraction process (e.g., the values of the subordinate types) (Step S405). In the example of FIG. 14, the value of the subordinate type "Ora" of the pattern P2 is compared with the value of the subordinate type "Mys" of the pattern P2.

In a case where all of the comparison targets subjected to the abstraction process match with each other (Yes in Step S406), the failure detection part 18 outputs the target learning pattern P1 as a search result (Step S407). It is to be noted that, in the Step S307 of FIG. 12 where the found learning pattern is output, the failure detection part 18 may also output an annotation indicating that the target operation message pattern matches the found learning pattern at a level of an abstraction process (in this example, an annotation indicating that the target operation message pattern P2 and the target learning pattern P1 match in a level of the subordinate type).

On the other hand, in a case where there is at least one comparison target that does not match (No in Step S406), the failure detection part 18 repeats performing the processes of Steps S403-S406 on the comparison target that does not match. In a case where the abstraction process can no longer be performed as a result of repeating the processes of Steps S403-S406 (No in Step S404), the failure detection part 18, determines that there is no learning pattern that matches the target operation message pattern (Step S408). The case where the abstraction process can no longer be performed includes a case where the comparison target does not match even where comparison is performed at the highest abstraction level (in this embodiment, the superordinate type).

In the example of FIG. 14, the comparison targets match at the level of the superordinate type (i.e. in this embodiment, the value of superordinate type "D" of the pattern P2 matches the value of the superordinate type "D2 of the pattern P1). Accordingly, the pattern P1 is output as a search result.

Figure 15:
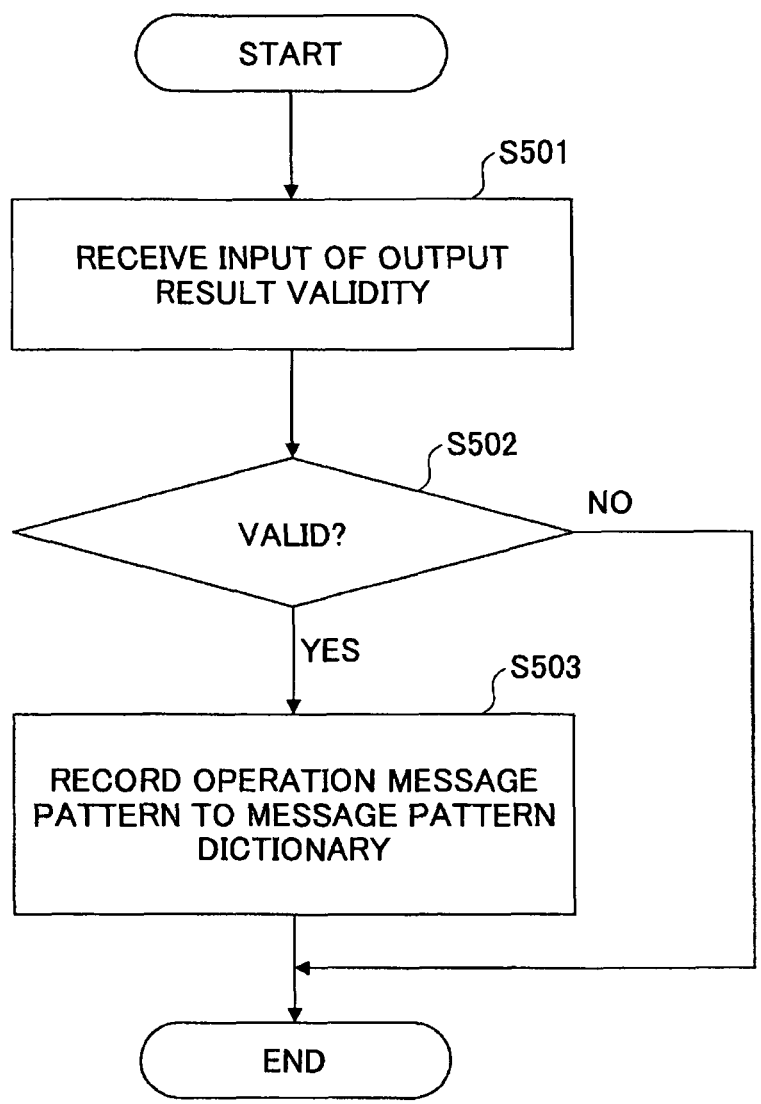
FIG. 15 is a flowchart for describing processes of a feedback operation according to an embodiment of the present invention.

Next, the process performed in Step S308 of FIG. 12 is described in detail. FIG. 15 is a flowchart for describing processes of a feedback operation according to an embodiment of the present invention.

In Step S501, the failure detection part 18 receives input regarding the validity of the detection result output by the failure detection part 18 in Step S307 of FIG. 12. In the inputting of the validity of the detection result, the failure type and the pattern ID of the learning pattern output in Step S307 of FIG. 12 can be designated together with information indicating the validity of the detection result. The inputting of the validity of the detection result may be performed by, for example, operating on a predetermined screen. A valid detection result signifies that a failure corresponding to a failure type indicated in the detection result has actually occurred.

In a case where the information indicating the validity of the detection result is input (Yes in Step S502), the failure detection part 18 records (registers) the operation message recorded in association with the learning pattern corresponding to a designated pattern ID (Step S503). More specifically, a message pattern record indicating the operation message pattern is added to the failure incident record corresponding to the designated failure type. In other words, the message pattern pertaining to the data process system 2 is learned in association with the failure incident.

Thus, after learning the message pattern pertaining to the data process system 2, failure can be detected even when an operation message pattern of the data process system 2 matching the learned message pattern is detected by comparing the message type ID groups of the detected operation message pattern and the learned message pattern. In this situation, operation of the data process system 2 is continued, and a message pattern is added to the message pattern dictionary storage part 15 in correspondence with the learning of a new operation message pattern. As a result, the message pattern dictionary storage part 15 not only functions to store message patterns of the data process system 1 but also for storing message patterns of the data process system 2.

In another embodiment where a unique message pattern dictionary storage part dedicated to the data process system 2 is provided separately from the data process system 1, the destination to which a message pattern of the data process system 2 is recorded (registered) in Step S503 may be the unique message pattern dictionary storage part. By separately storing the message pattern of the data process system 2, more message patterns can be stored in the unique message pattern dictionary part while referring to the message pattern dictionary part 15. It is to be noted that the searching process in Step S401 of FIG. 13 may performed on both the message pattern dictionary storage part 15 and the unique message pattern dictionary part until sufficient amount of information are stored in the unique message pattern dictionary part.

In a case where the unique message pattern dictionary storage part 15 is the destination to which a message pattern of the data process system 2 is recorded (registered) in Step S503, the message pattern of the data process system 2 may also be redundantly recorded (registered) to the message pattern dictionary storage part 15. In this case, the message pattern dictionary storage part 15 becomes a message pattern dictionary storage part shared by the data process system 1 and the data process system 2.

Hence, with the above-described embodiments of the present invention, in a case of comparing message patterns having message type IDs (messages) that do not match, type information (subordinate type information, superordinate type information) of the output origins of the messages are compared. In a case where the type information matches with each other as a result of the comparison, the system statuses of the compared message patterns are determined to be the same. Accordingly, failure of the data process system 2 can be detected based on the group of messages output in the data process system 1. As a result, the workload for detecting failure of the data process system 2 can be reduced.

Further, various type information having different abstraction levels are assigned to each message in a message pattern. Accordingly, comparison of message patterns is performed by determining whether there is a message pattern having type information in any of the abstraction levels that matches another type information of another message pattern. Thereby, the comparing of message patterns can be performed with high flexibility.

Particularly, in an operation of monitoring the occurrence of failure in plural systems including different configuration elements, the above-described message patterns can be effectively utilized.

Further, a message pattern (failure) being detected in many systems can be effectively learned as a new message pattern by recording (reflecting) the message pattern to the initial learning results.

In the above-described embodiments of the present invention, the element type determination part 16 is an example of a determination part. Further, the failure detection part 18 is an example of a comparison part. Further, the message pattern dictionary storage part 15 is an example of a message group storage part.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium on which a program for causing a computer to perform a data process method is recorded, the data process method comprising:
   storing a type information of a configuration element of a first data process system in association with an identification information of the configuration element in a configuration information storage part;
   determining the type information corresponding to a message output from the first data process system, the message including the identification information;
   comparing a first message group including a plurality of first messages and a second message group including a plurality of second messages, the plural second messages being stored in association with the type information of a second data process system in a message group storage part;
   determining whether the plural first messages match the plural second messages;
   determining whether the type information of the plural first messages match the type information of the plural second messages when the plural first messages do not match the plural second messages;
   increasing abstraction levels of the type information of the plural first and second messages in a case where the type information of the plural first messages do not completely match the type information of the plural second messages; and
   determining whether the type information of the plural first messages match the type information of the plural second messages by comparing the abstraction levels of the type information of the plural first and second messages in a case where the abstraction levels of the type information of the plural first and second messages are increased.

2. The non-transitory computer-readable recording medium as claimed in claim 1, wherein the data process method further comprises:
   storing a plurality of the type information having different abstraction levels in association with each of the plural second messages in the message group storage part; and
   determining whether any of the plural type information match the type information of at least one of the plural first messages when the at least one of the plural first messages does not match the plural second messages.

3. The non-transitory computer-readable recording medium as claimed in claim 1, wherein the data process method further comprises:
   storing the first plural messages in the message group storage part when the type information of the plural first messages matches the type information of the plural second messages.

4. A data process apparatus comprising:
   a processor to execute a process including:
      storing a type information of a configuration element of a first data process system in association with an identification information of the configuration element in a configuration information storage part;
      determining the type information corresponding to a message output from the first data process system, the message including the identification information;
      comparing a first message group including a plurality of first messages and a second message group including a plurality of second messages; and
      storing the plural second messages in association with the type information of a second data process system in a message group storage part;
   wherein the processor is configured to determine whether the plural first messages match the plural second messages and determine whether the type information of the plural first messages match the type information of the plural second messages when the plural first messages do not match the plural second messages,
   wherein the processor is further configured to increase abstraction levels of the type information of the plural first and second messages in a case where the type information of the plural first messages do not completely match the type information of the plural second messages, and determine whether the type information of the plural first messages match the type information of the plural second messages by comparing the abstraction levels of the type information of the plural first and second messages in a case where the abstraction levels of the type information of the plural first and second messages are increased.

5. The data process apparatus as claimed in claim 4, wherein the processor is configured to store a plurality of the type information having different abstraction levels in association with each of the plural second messages in the message group storage part, wherein the processor is configured to determine whether any of the plural type information match the type information of at least one of the plural first messages when the at least one of the plural first messages does not match the plural second messages.

6. The data process apparatus as claimed in claim 4, wherein the processor is configured to store the first plural messages in the message group storage part when the type information of the plural first messages matches the type information of the plural second messages.

7. A method for processing data, the method comprising:
   storing a type information of a configuration element of a first data process system in association with an identification information of the configuration element in a configuration information storage part;

determining the type information corresponding to a message output from the first data process system, the message including the identification information;

comparing a first message group including a plurality of first messages and a second message group including a plurality of second messages, the plural second messages being stored in association with the type information of a second data process system in a message group storage part;

determining whether the plural first messages match the plural second messages;

determining whether the type information of the plural first messages match the type information of the plural second messages when the plural first messages do not match the plural second messages;

increasing abstraction levels of the type information of the plural first and second messages in a case where the type information of the plural first messages do not completely match the type information of the plural second messages; and determining whether the type information of the plural first messages match the type information of the plural second messages by comparing the abstraction levels of the type information of the plural first and second messages in a case where the abstraction levels of the type information of the plural first and second messages are increased.

8. The method as claimed in claim 7, further comprising:
storing a plurality of the type information having different abstraction levels in association with each of the plural second messages in the message group storage part; and
determining whether any of the plural type information match the type information of at least one of the plural first messages when the at least one of the plural first messages does not match the plural second messages.

9. The method as claimed in claim 7, further comprising:
storing the first plural messages in the message group storage part when the type information of the plural first messages matches the type information of the plural second messages.

10. A data process apparatus comprising:
a first memory that stores a type information of a configuration element of a first data process system in association with an identification information of the configuration element;
a processor that determines the type information corresponding to a message including the identification information output from the first data process system and compares a first message group including a plurality of first messages and a second message group including a plurality of second messages; and
a second memory that stores the plural second messages in association with the type information of a second data process system;
wherein the processor is configured to determine whether the plural first messages match the plural second messages and determine whether the type information of the plural first messages match the type information of the plural second messages when the plural first messages do not match the plural second messages;
wherein the processor is further configured to increase abstraction levels of the type information of the plural first and second messages in a case where the type information of the plural first messages do not completely match the type information of the plural second messages, and determine whether the type information of the plural first messages match the type information of the plural second messages by comparing the abstraction levels of the type information of the plural first and second messages in a case where the abstraction levels of the type information of the plural first and second messages are increased.

* * * * *